United States Patent
Kopp et al.

(10) Patent No.: US 6,717,962 B1
(45) Date of Patent: Apr. 6, 2004

(54) METHOD FOR ESTABLISHING A COMMUNICATION LINK, SUBSCRIBER TERMINAL AND SWITCHING CENTER

(75) Inventors: Dieter Kopp, Hemmingen (DE); Jürgen Sienel, Leonberg (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/189,270

(22) Filed: Nov. 10, 1998

(30) Foreign Application Priority Data

Nov. 11, 1997 (DE) .......................... 197 49 770

(51) Int. Cl.⁷ ................................. H04J 3/02
(52) U.S. Cl. ...................................... 370/540
(58) Field of Search .................. 370/230, 230.1, 370/231, 232, 235, 236, 465, 468, 522, 524, 537, 540

(56) References Cited

U.S. PATENT DOCUMENTS

| | | | | |
|---|---|---|---|---|
| 4,153,916 A | * | 5/1979 | Miwa et al. | 358/406 |
| 4,953,180 A | * | 8/1990 | Fieschi et al. | 370/465 |
| 4,965,787 A | * | 10/1990 | Almond et al. | 370/466 |
| 5,023,869 A | * | 6/1991 | Grover et al. | 370/421 |
| 5,327,576 A | * | 7/1994 | Uddenfeldt et al. | 370/333 |
| 5,491,565 A | * | 2/1996 | Naper | 358/468 |
| 5,644,570 A | * | 7/1997 | Skalsky | 370/468 |
| 5,857,147 A | * | 1/1999 | Gardner et al. | 455/67.1 |
| 6,044,082 A | * | 3/2000 | Nygård et al. | 370/437 |
| 6,118,834 A | * | 9/2000 | Rasanen | 370/231 |
| 6,130,879 A | * | 10/2000 | Liu | 370/230 |
| 6,144,464 A | * | 11/2000 | Rupp et al. | 358/442 |
| 6,278,693 B1 | * | 8/2001 | Aldred et al. | 370/230 |
| 6,366,580 B1 | * | 4/2002 | Bradley et al. | 370/395.2 |

FOREIGN PATENT DOCUMENTS

| | | |
|---|---|---|
| DE | 3721047 | 1/1988 |
| DE | 19618470 | 11/1997 |
| EP | 0651542 | 5/1995 |

OTHER PUBLICATIONS

"Digitales Vermittlungssystem EWSD" by K. Langner (Telekom Unterrichtsblatter, vol. 46, 2, 1993) [EWSD digital switch system].
ITU–T Recommendation I.460 (Facsimile III.8—Rec. I.460, 1993, Recommendation from the Blue Book.
CCITT Recommendation I.464, Geneva 1991.
ITU–T Recommendation I.460 (Facsimile III.8—Rec I.460, 1993) Integrated Services Digital Network (ISDN).
CCITT Recommendation I.464 Integrated Services Digital Network (ISDN), Overall Network Aspects and Functions, ISDN User–Network Interfaces.
Patent Abstract of Japan, 081726878, date of publication Feb. 7, 1996.
Patent Abstract of Japan, 59–127456, Jul. 23, 1984.
Digitales Vermittlungssystem EWSD (EWSD digital switching system) by K. Langner (Telekom Unterrichtsblatter, vol. 46, 2, 1993).

* cited by examiner

*Primary Examiner*—Chi Pham
*Assistant Examiner*—Keith M. George

(57) ABSTRACT

A method for establishing a digital communication link between an originating subscriber terminal and at least one called subscriber terminal, said method being better adapted to the transmission bandwidth used by a subscriber, has the following steps: First, a provisional link at a standard transmission rate from the originating subscriber terminal to the called subscriber is requested from a switching center. That provisional link is then established by the switching center. Next, a new, lower value for the transmission rate is selected by the originating subscriber terminal. That new value is then agreed upon with the switching center. Lastly, the latter switches the transmission rate of the provisional link over to the new, lower value, thus completing establishment of the communication link. The invention can advantageously be used in a telecommunications network, which for example operates according to the ISDN standard, to economize on transmission capacity and reduce call charges.

8 Claims, 1 Drawing Sheet

METHOD FOR ESTABLISHING A COMMUNICATION LINK, SUBSCRIBER TERMINAL AND SWITCHING CENTER

TECHNICAL FIELD

The invention concerns a method for establishing a digital communication link, in particular a digital voice link, between at least two subscriber terminals. The invention further concerns a subscriber terminal and a switching center for establishing the digital communication link.

BACKGROUND OF THE INVENTION

For digital telephone links, according to the ISDN standard, communication links are configured between two subscriber terminals at a standard transmission rate of 64 kbit/s per B channel. This is described, for example, in the article "Digitales Vermittlungssystem EWSD" [EWSD digital switching system] by K. Langner (Telekom Unterrichtsblätter, Vol. 46, 2, 1993). An originating subscriber negotiates the call request via a control channel (D channel) with a switching center, which then sets up the communication link.

According to ITU-T Recommendation I.460 (Facsimile III.8–Rec. I.460, 1993), it is possible in ISDN to use other transmission rates lower than 64 kbit/s, for example 8, 16, or 32 kbit/s, and then to adapt them to the transmission rate of a B channel. There furthermore exists the possibility of multiplexing several data signals with a lower transmission rate into one 64 kbit/s B channel.

SUMMARY OF THE INVENTION

It is the object of the invention to provide a method with which it is possible, in a digital telecommunications network, to establish between at least two subscriber terminals a communication link which is better adapted to the transmission bandwidth used by one subscriber. Further objects of the invention are to provide a subscriber terminal and a switching center which are suitable for carrying out the method.

The object is achieved by a method for establishing a digital communication link between an originating subscriber terminal and at least one called subscriber terminal, having the steps of requesting from a switching center a link from the originating subscriber terminal to the called subscriber terminal; and establishing the link at a standard transmission rate, further having the steps of selecting a new, lower value for the transmission rate; agreeing upon the new, lower value with the switching center; and switching the transmission rate of the link over to the new, lower value.

The object is also achieved by a subscriber terminal for establishing a digital communication link to at least one called subscriber terminal, having the following devices: means for requesting from a switching center a provisional link to the called subscriber at a standard transmission rate; means for selecting a new, lower value for the transmission rate; and means for agreeing with the switching center upon the new, lower value.

The object is still further achieved by a switching center for establishing a digital communication link between at least two subscriber terminals, having the following devices: means for establishing, at a standard transmission rate, a provisional link to a called subscriber terminal requested by an originating subscriber terminal; means for agreeing with the originating subscriber terminal upon a new, lower value for the transmission rate; and means for switching the transmission rate of the provisional link over to the new, lower value.

One advantage of the invention is that the available transmission capacity of a telecommunications network can be used more effectively, and that only as much transmission capacity as is actually necessary needs to be made available for a communication link. A further advantage is that if a call metering system depends on the maximum payload that can be transmitted via the communication link that is established, there is a cost economy in terms of call charges for the subscriber.

BRIEF DESCRIPTION OF THE DRAWING

The invention will be explained below in an exemplifying embodiment, with reference to the single FIGURE. The FIGURE shows a flow chart with the individual steps of the method.

BEST MODE FOR CARRYING OUT THE INVENTION

Figure 1:
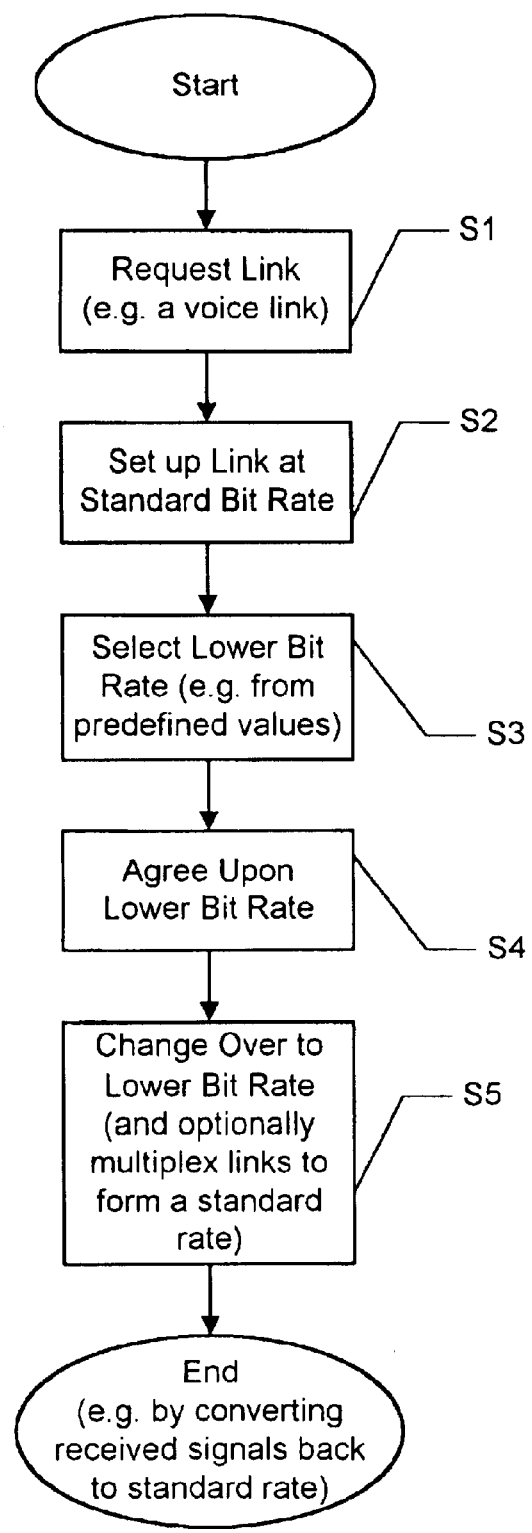

The invention is based on the recognition that for some applications, in particular for voice transmission using modern voice coders (codecs), the maximum transmission rate of a communication link, which in the case of ISDN is, for example, 64 kbit/s, is not entirely necessary. If two subscriber terminals connected via a communication link are both capable of using a previously defined voice coder, the transmission rate can then be reduced. This makes it possible to economize on transmission capacity in a telecommunications network.

A basic idea of the invention consists in first setting up a provisional communication link at a predefined standard transmission rate (for example, 64 kbit/s), then selecting a new value for the transmission rate, agreeing upon that new value with a switching center, and then changing the transmission rate of the provisional communication link over to the new value.

A variety of criteria can play a role in the selection of the new value: A determination can be made as to the transmission rates which are supported by the called subscriber terminal, the voice coders which the originating and called subscriber terminals can use, the magnitude of the required transmission rate, and the quality with which a communication transmission is to take place.

In the exemplifying embodiment, the following steps shown in the flow chart of FIG. 1 are executed in succession:

S1: The originating subscriber terminal requests, from the switching center to which it is connected, a communication link to a called subscriber terminal at the standard transmission rate of 64 kbit/s. The communication link requested is to be a provisional link. The subscriber terminals are ISDN telephones; the communication link is to be used as a voice link.

S2: The call request is implemented by the switching center by establishing the communication link to the called subscriber terminal as a provisional link. The switching center in this case is a local switching center. Depending on the location of the called subscriber terminal, the communication link can run via further switching centers, for example a long-distance switching center and the local switching center to which the called subscriber terminal is connected.

S3: The originating subscriber terminal then selects a new value for the transmission rate. The selection is made from a series of possible predefined values. For this purpose, the originating subscriber terminal requests from the called subscriber terminal a list of possible values. The originating subscriber terminal furthermore asks the called terminal which voice coders can be used. The lowest value with which the voice coder can operate is then selected. In the exemplifying embodiment, this is 4 kbit/s.

S4: The selected value is then agreed upon between the switching center and the originating subscriber terminal as the new value for the transmission rate of the communication link. This agreement can be accomplished via the D channel protocol of the control channel.

S5: The switching center then changes the transmission rate of the provisional link over to the agreed-upon lower value. Establishment of the communication link is thereby complete.

From the time of the changeover, a voice coder which compresses voice signals to be transmitted and decompresses received voice signals is used in both the originating and the called subscriber terminal. The same protocol with the same bit sequence frequency (standard transmission rate) can always be used, before and after the changeover, between the subscriber terminal and switching center. The new transmission rate between subscriber terminal and switching center can be adapted to the standard transmission rate, as defined by ITU-T I.460. A transmission at a reduced transmission rate takes place, however, between the local switching centers to which the originating and called subscriber terminals are respectively connected.

In the switching center to which the originating subscriber is connected, several signals of low-transmission-rate communication links of other subscribers can advantageously be multiplexed into a single signal at the standard transmission rate, as provided for in ITU-T I.460. For example, 16 communication links at 4 kbit/s each, or 4×8 kbit/s and 8×4 kbit/s, or even other combinations of possible lower transmission rates (32 kbit/s, 16 kbit/s, 8 kbit/s, 4 kbit/s) are within the realm of possibility. The multiplexed signal at the standard transmission rate can then be transmitted via a single channel to another switching center, for example the long-distance switching center. Line capacity in the telecommunications network is thereby economized. It is particularly advantageous in this context if the possible lower values for the transmission rate are integral divisors of the standard transmission rate (for example 2, 4, 8, or 16 of 64).

In addition to telephone calls, the communication link can also be used for data transmission, fax, or the like. The transmission rate in this case is adapted to the transmission rate necessary for the particular function. Depending on the types of fax machines that are transmitting and receiving, a fax can be transmitted, for example, at 9.6 kbit/s. For data transmission, the transmission rate can be determined by the volume of data to be transmitted; 2.4 kbit/s may be sufficient, for example, for online services.

Advantageously, the call charge billed by the operator of the telecommunications network for communication links at a reduced transmission rate is lower than for those at the standard transmission rate.

Before changing over the transmission rate, it is advantageous if the new value is also agreed upon between the called and originating subscriber terminals, so that no disruption of the link occurs. In the case of ISDN, this agreement can be accomplished via the transmission channel (B channel), since the control channel is not switched transparently through from one terminal to the other. Alternatively, the changeover operation can also be signaled by the interposed switching centers to the called subscriber terminal via the control channel. Another possibility is to integrate into the called subscriber terminal an apparatus which automatically detects a changeover by recognizing the new transmission rate.

The communication link can also be a conference call from one originating subscriber terminal to several called subscriber terminals, or a forwarded connection created by a call transfer. In the latter case, it is possible for only a portion of the communication link to be operated at the reduced transmission rate, for example if the subscriber terminal to which the call was forwarded does not have a voice coder and therefore does not support calls at a reduced transmission rate. In the former case (conference call), all the subscriber terminals involved should use a voice coder and should support calls at a reduced transmission rate in order for communication among all the terminals to be possible (lowest common denominator).

The switching center can also be a telecommunications system (private branch exchange). This is advantageous, for example, for company networks which consist of subnetworks connected to one another via leased lines.

In an advantageous development of the method according to the present invention, the transmission rate is reduced in steps. The stepwise reduction in the transmission rate can be performed until a connection with acceptable voice quality is achieved. If the quality of the voice connection is too poor, due to excessive data reduction by the voice coder or because of transmission errors, operation is then switched back to the last acceptable transmission rate. This procedure also makes possible an automatic determination of the transmission rates which are supported by the called subscriber terminal.

It may also prove advantageous to switch the transmission rate back to the standard transmission rate during a call, for example if the quality of the connection is poor, i.e. if transmission errors occur which interfere with a connection at a reduced transmission rate.

A subscriber terminal suitable for carrying out the method has means for requesting a provisional connection to a called subscriber terminal from the switching center to which it is connected. In telecommunications networks according to the ISDN standard, this is an interface to the switching center via the D channel, by way of which the connection request is effected using the D channel protocol. The subscriber terminal also has a selector device for selecting a new, lower value for the transmission rate. The selector device can also determine which value is suitable. The selector device can also be a function that can be activated by the user using a key, for example a "high bit rate→low bit rate" switch. The subscriber terminal furthermore has means for agreeing upon the new value with the switching center. In the case of ISDN, this can also be the interface to the D channel. Advantageously, the subscriber terminal has a voice coder. The aforementioned functional units can be embodied, for example, as elements (modules) of a software program which controls the operation of a digital, processor-controlled subscriber terminal.

A switching center suitable for carrying out the method possesses, in addition to the usual means for establishing a communication link requested by an originating subscriber terminal to a called subscriber terminal at the standard transmission rate, means for agreeing upon the new value for the transmission rate with the originating subscriber terminal, and means for changing the transmission rate of the established communication link over to the new, lower value. Advantageously, the switching center also possesses means for multiplexing several communication signals at lower transmission rates into one signal at the standard transmission rate. The aforementioned functional units can be embodied as elements (modules) of a software program which controls the operation of a digital switching center.

In an advantageous development of the switching center according to the present invention, the latter additionally possesses means for converting the signals received at the lower transmission rate via the connection to the originating subscriber terminal into signals at the standard transmission rate. A voice connection from the originating subscriber terminal at a reduced bit rate is thereby possible, even to subscriber terminals which do not support calls at a reduced transmission rate. For this purpose, a conversion and adaptation of the received signals to signals at the standard transmission rate is performed in the destination switching center to which the called subscriber terminal is connected. These converted signals are transmitted over the remaining connection segment to the called subscriber terminal. In this instance, the agreement as to the lower transmission rate is arrived at with the destination switching center rather than with the called subscriber terminal.

What is claimed is:

1. A method for establishing a digital communication link between an originating subscriber terminal and at least one called subscriber terminal, comprising the following steps:

requesting from a switching center a link from the originating subscriber terminal to the called subscriber terminal;

establishing the link at a standard transmission rate, selecting a new, lower transmission rate;

agreeing upon the new, lower transmission rate with the switching center; and switching the standard transmission rate of the link over to the new, lower transmission rate, wherein signals of several communication links at lower transmission rates are multiplexed in the switching center into a signal at the standard transmission rate.

2. The method as defined in claim 1, in which the new, lower transmission rate is selected from a series of predefined values.

3. The method as defined in claim 2, in which a list with the series of predefined values is requested from the called subscriber terminal.

4. The method as defined in claim 1, in which the value of the standard transmission rate is an integral multiple of the new, lower transmission rate.

5. The method as defined in claim 1, in which the communication link is a voice link for transmitting digital telephone conversations.

6. The method as defined in claim 5, in which the voice to be transmitted is digitized and compressed.

7. The method as defined in claim 1, in which the new, lower transmission rate is also agreed upon between the called and originating subscriber terminals.

8. The method as defined in claim 1, in which the new, lower transmission rate is automatically recognized by the called subscriber terminal.

* * * * *